Jan. 1, 1952
A. J. MILLER
2,580,691
FLUID CONTROL SYSTEM
Filed March 22, 1945
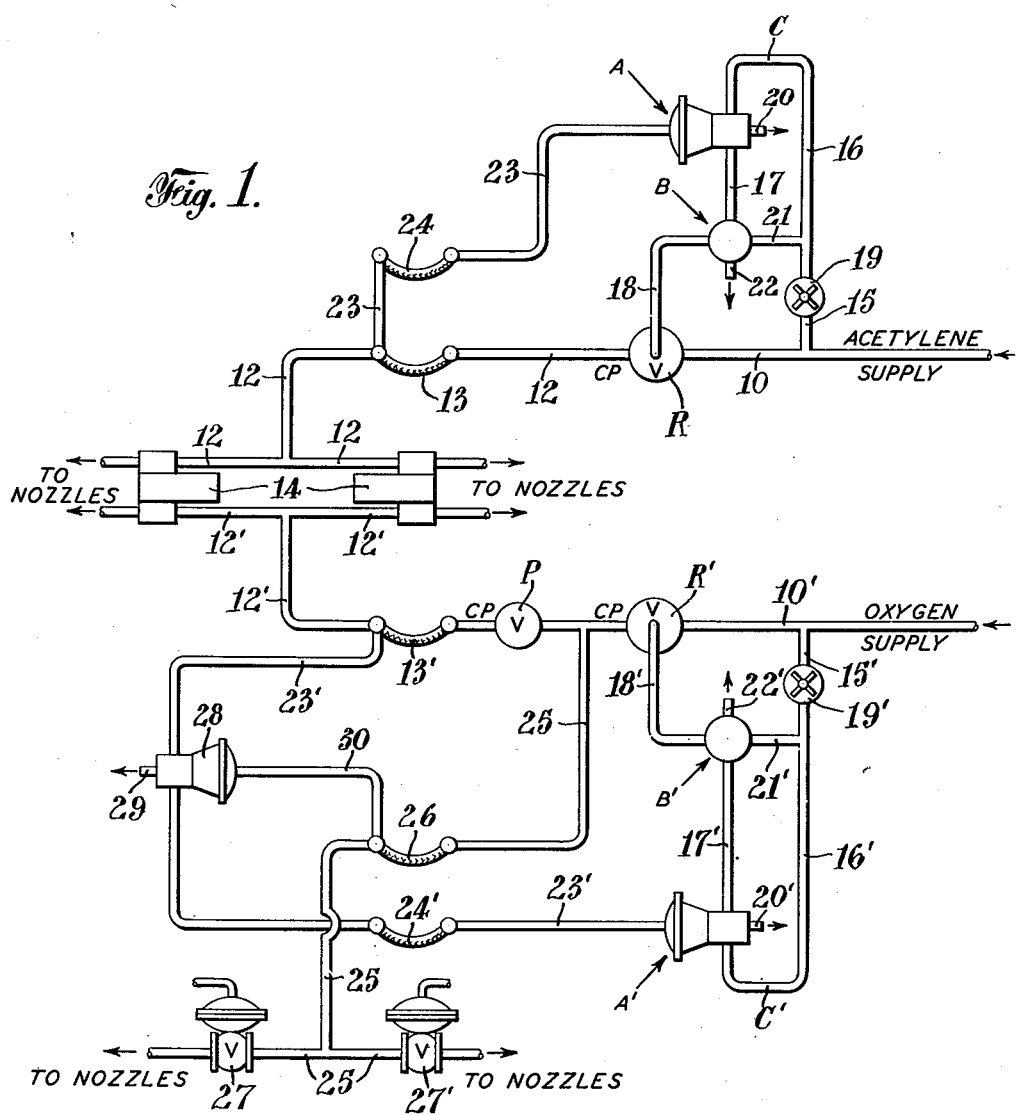
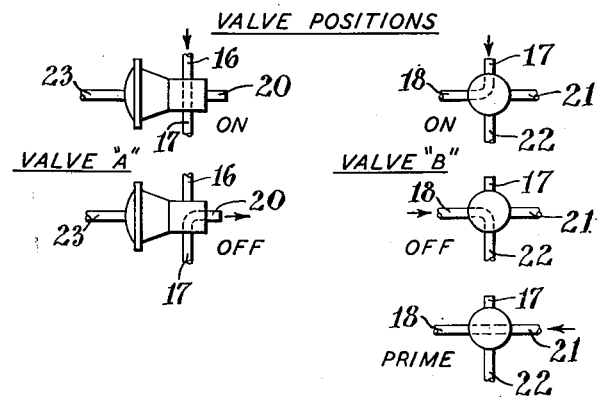
INVENTOR
ALFRED J. MILLER
BY
ATTORNEY Patented Jan. 1, 1952

2,580,691

UNITED STATES PATENT OFFICE 2,580,691

FLUID CONTROL SYSTEM

Alfred J. Miller, Garwood, N. J., assignor, by mesne assignments, to Union Carbide and Carbon Corporation, a corporation of New York Application March 22, 1945, Serial No. 584,151

15 Claims. (Cl. 50—1)

This invention relates to a system for controlling the fluid flowing therein and especially for shutting off the flow of fluid when an appreciable leak occurs in a fluid delivery conduit of the system.

In applications where a fluid such as acetylene or oxygen is supplied to apparatus by a hose or other conduit subject to sudden appreciable leakage it is desirable to shut off the flow of such fluid immediately upon occurrence of a leak or break in the fluid delivery system. To achieve such control it is desirable that the system be automatically responsive to a variation in some physical property of the fluid under control yet sufficiently insensitive to a change in a control variable so that the fluid will be shut off only when an appreciable change, such as caused by a leak, occurs; but not in response to minor fluctuations of the control variable. It is also desirable that when the system is shut down, means be available for promptly re-setting the system with a minimum of adjustment.

The principal objects of this invention are to provide a novel system for controlling flow of fluid which system is simple and easy to operate, which will automatically shut off the fluid flowing therein when an appreciable leak occurs, and which, after shut-off, may be re-set for operation with a minimum of manipulation. specifically, this invention has for its object the provision of a practical self-operating system for shutting off the flow of acetylene and oxygen to a metal conditioning or desurfacing machine when an appreciable leak occurs in the hose leading to the machine, which system may be readily restored to operation after repair of the leak. Other objects and novel features will become apparent from the following description and the accompanying drawing, in which:

Fig. 1 is a schematic representation of a system embodying the principles of the invention; and Fig. 2 is a schematic representation of the various positions of valves A and B of Fig. 1.

In general, the fluid control system of this invention comprises a conduit; a first pressure responsive means controlling the flow of fluid in said conduit; a second pressure responsive means controlling the pressure of said fluid actuating said first pressure responsive means, said second pressure responsive means being responsive to the pressure of said fluid downstream from said first pressure responsive means; and a by-pass about said second pressure responsive means for rendering operation of said system independent of said second pressure responsive means.

Referring to Fig. 1 it will be observed that the gas control system for a desurfacing machine, for example, may be divided for purposes of analysis into an acetylene supply and delivery system and an oxygen supply and delivery system, the acetylene system occupying the upper half of the figure. Considering the acetylene system first, acetylene from a source (not shown) of acetylene under pressure is conducted through the acetylene supply conduit 10 to a device for maintaining substantially constant the pressure of the acetylene downstream therefrom. Such a device may be a pressure regulator, for example, a conventional pilot operated pressure regulator R, the valve of which will be completely open or closed depending upon the magnitude of the fluid pressure impressed upon a pressure responsive element, such as a diaphragm, therein. The acetylene under the control of the regulator R flows through the acetylene delivery conduit 12 of which the hose 13 constitutes a section, through a shut-off valve 14, to the nozzles of the desurfacing machine as indicated in Fig. 1.

The valve of the pressure regulator R is maintained open by the static pilot pressure of acetylene exerted upon the pressure responsive element which in turn is operably connected to said valve. The static pressure of acetylene is transmitted to the pressure responsive element by an acetylene supply pressure conduit C having consecutively communicating sections 15, 16, 17 and 18. A pilot regulator 19 may be inserted between sections 15 and 16 for reducing the static pressure of the acetylene. A pressure responsive shut-off valve, for example, the three-way diaphragm valve A is normally biased to a closed position and is also inserted in the conduit C between sections 16 and 17. Valve A is so installed that when the valve is in its closed or "off" position, the section 17 is vented through a conduit 20 which may, if desired, be connected to the atmosphere, or to a receiver wherein fluid is contained at a pressure less than the pressure of acetylene in section 16, and the end of section 16 adjacent the valve A is simultaneously sealed. When the valve A is in its open or "on" position, the sections 16 and 17 are in communication with each other and the vent 20 is closed.

The "on" and "off" positions of valve A are schematically illustrated in Fig. 2. A by-pass 21 about valve A is provided between the sections 16 and 17. At the junction of by-pass 21 with the section 17 a four-way valve B is provided for selectively connecting the section 18 and the pressure responsive element of the regulator R with the section 17, the by-pass 21, and the vent 22. For maintaining the valve A open, the static pressure of fluid in the acetylene delivery conduit 12 is transmitted by the acetylene delivery pressure conduit 23, of which the hose 24 constitutes a section, from a point downstream from the hose 13 to the pressure responsive element of the valve A.

When acetylene is being supplied to the acetylene delivery conduit 12, the valve of the pressure regulator R is open. To maintain the pressure regulator R open, the static pressure of fluid from the acetylene supply conduit 10 is transmitted to the pressure responsive element of the pressure regulator R through section 15 of the acetylene supply pressure conduit C, the pilot pressure regulator 19, section 16, valve A (which is in the position shown by "on" in Fig. 2), section 17, the four-way valve B (which is also in the position shown by "on" in Fig. 2), and section 18. To maintain the valve A open, the static pressure of fluid from the acetylene delivery conduit 12 is transmitted through the acetylene delivery pressure conduit 23 to the pressure responsive element of the valve A.

Should an appreciable leak develop in the hose 13, 24, or other section of the conduit 12, the acetylene delivery pressure will fall below a certain minimum value necessary to maintain the valve A in its "on" position, and valve A will consequently assume the "off" position represented in Fig. 2. With valve A in the "off" position the section 16 of the acetylene supply pressure conduit C is closed and section 17 communicating with the pressure responsive element of the pressure regulator R is open to the vent 20. When the static pressure of fluid acting upon the pressure responsive element of the pressure regulator R is released, the valve of the regulator R shuts off the flow of fluid from the acetylene supply conduit 10 to the acetylene delivery conduit 12.

After the break has been repaired, flow of acetylene to the conduit 12 may be re-established by first turning the four-way valve B to the "prime" position as indicated in Fig. 2; such valve being so constructed that when released, it will, by spring action, then return to the "on" position. When valve B is in the "prime" position, section 18 communicates only with by-pass 21, the acetylene supply pressure is exerted upon the pressure responsive element of the pressure regulator R, and flow of acetylene is re-established. The acetylene delivery pressure having assumed its former value is transmitted to the diaphragm of valve A which assumes its "on" position. The four-way valve B may now be released to return to the "on" position to establish communication of section 18 with section 17 rather than by-pass 21.

If it is desired at any time to shut off the flow of acetylene, four-way valve B is simply turned to the "off" position as represented in Fig. 2 whereupon section 18 communicates only with the vent 22, the fluid pressure being exerted upon the pressure responsive element of the pressure regulator R is released, and the flow of fluid through the regulator is discontinued.

The oxygen system occupying the lower half of Fig. 1 supplies preheat oxygen for supporting the combustion of the acetylene and also cutting or desurfacing oxygen which must be supplied at a pressure somewhat above that of the preheat oxygen. The preheat oxygen is supplied through a system similar to the one for supplying acetylene and therefore corresponding members of the preheat oxygen system are assigned reference characters identical to those of the acetylene system except that the reference characters of the preheat oxygen system are identified by a prime. Because the preheat oxygen pressure may be less than that of the cutting oxygen, an additional pressure regulator P may be inserted in the oxygen delivery conduit but this addition does not alter the operation of the preheat oxygen system which is similar in principle to the acetylene system previously described.

The cutting oxygen flows through the cutting oxygen delivery conduit 25 which is connected to the oxygen supply conduit upstream from the pressure regulator P but downstream from the pressure regulator R'. The cutting oxygen delivery conduit 25, of which the hose 26 constitutes a section, is provided with remote controlled valves 27, 27. A pressure responsive shut-off valve, for example, a normally-closed three-way diaphragm valve 28 which is similar to the valves A and A', is inserted in the preheat oxygen pressure conduit 23'. Valve 28 is normally biased to a closed position and is so installed that when the valve is in its closed or "off" position the section of the conduit 23' remote from the preheat oxygen delivery conduit 12' is vented to the atmosphere, or to a receiver 29 wherein fluid is contained at a pressure less than the pressure of oxygen in said section and the portion of conduit 23' immediate to the conduit 12' is simultaneously sealed. When the valve 28 is in its open or "on" position, the sections of the conduit 23' are in communication with each other and the receiver 29 is closed. To maintain the valve 28 open, the static pressure of fluid from the cutting oxygen delivery conduit 25 is transmitted through the cutting oxygen delivery pressure conduit 30 to the pressure responsive element of the valve 28. Should an appreciable leak develop in hose 13' or hose 26 or other section of the conduits 12' or 25, the cutting oxygen delivery pressure will fall below a certain minimum value necessary to maintain the valve 28 in its "on" position and valve 28 will consequently assume the "off" position represented in Fig. 2 for valve A. When the static pressure of fluid acting upon the diaphragm of valve A' is released by valve 28, the valve A' shuts off the section 16' and vents the section 17' to outlet 20'. When hose 13' breaks, conduit 23' is vented through the break and the pressure on the diaphragm of valve A' is likewise released. A break of hose 24' will also release pressure acting on the diaphragm of valve A' and cause it to assume the "off" position and shut the gas supply.

To re-establish flow of oxygen it is simply necessary to manipulate the four-way valve B' in a manner similar to that previously outlined for valve B. Thus, control over the oxygen supply is achieved regardless of whether a leak develops in the preheat or cutting oxygen delivery conduits.

An advantage of this invention resides in the freedom from adjustment in the pressure setting at which the main valve R closes. Setting of the valves A and R may be made by experts and those settings locked against change. By turning valve B to the "prime" position the operation may be reestablished after a shut off without any need for changing the adjustment or pressure responsive setting of any of the valves. Of course the valve B is later moved from the "prime" to "on" position to have the valve closing mechanism of the main valve R responsive to the static pressure responsive cut off of valve A in its "on" position. Another advantage of the present invention is the adaptibility of the main conduit valve R to function not only as an automatic pressure responsive cut off but also as a shut-off valve operated by remote control of the valve B when in its "off" position, venting the static pressure in the valve R and closing it. As used herein the term "static pressure" is not intended to preclude the absence of slight fluid movement or a bleeder action.

I claim:

1. A fluid control system comprising in combination a fluid supply conduit, a valve for said conduit, pressure responsive mechanism for opening said valve on application of pressure and for closing it on release of pressure, a source of fluid pressure, a pilot pressure regulator for supplying substantially static pressure to said mechanism from said pressure source for holding said valve open, means responsive to pressure in said conduit downstream from said conduit valve for closing the supply of static pressure from said regulator to said mechanism in response to a predetermined low pressure and for venting pressure from said mechanism to close said valve, a by-pass between said regulator and mechanism around said pressure responsive means, and a valve means selectively controlling said by-pass whereby substantially static pressure may be supplied to said mechanism from said regulator independently of said pressure responsive means, or substantially static pressure may be supplied to said mechanism from said regulator through said pressure responsive means.

2. A fluid control system comprising in combination a fluid supply conduit, a valve for said conduit, pressure responsive mechanism for opening said valve on application of pressure and for closing it upon release of pressure, a source of fluid pressure, a pilot pressure regulator for supplying substantially static pressure from said source to said mechanism for holding said valve open, means responsive to pressure in said conduit downstream from said conduit valve for closing the supply of substantially static pressure from said regulator to said mechanism in response to a predetermined low pressure and for venting pressure from said mechanism to close said valve, a by-pass between said regulator and mechanism around said pressure responsive means, and a valve selectively controlling said by-pass whereby substantially static pressure may be supplied to said mechanism from said regulator independently of said means, or pressure may be supplied from said regulator to said mechanism through said pressure responsive means, said valve controlling said by-pass also being adapted to vent pressure from said mechanism independently of said pressure responsive means.

3. A fluid control system comprising in combination a fluid supply conduit, a valve for said conduit, pressure responsive mechanism for opening said valve on application of pressure and for closing it upon release of pressure, a pilot pressure regulator for supplying substantially static pressure from said conduit upstream from said valve to said mechanism for holding said valve open, means responsive to pressure in said conduit downstream from said conduit valve for closing the supply of substantially static pressure from said regulator to said mechanism in response to a predetermined low pressure and for venting pressure from said mechanism to close said valve, by-pass between said regulator and mechanism around said pressure responsive means, and a valve selectively controlling said by-pass, said valve controlling said by-pass being a multi-position construction for closing said by-pass and transmitting pressure from the regulator and through said pressure responsive means to said mechanism, or for venting the pressure from said mechanism and closing the connection between said means and mechanism, or for opening said by-pass and closing the connection between said means and mechanism.

4. A fluid control system comprising in combination a fluid supply conduit, a valve for said conduit, pressure responsive mechanism for opening said valve upon application of pressure and for closing it upon release of pressure, a source of fluid pressure, a pilot pressure regulator for supplying substantially static pressure from said source of pressure to said mechanism for holding said valve open, means responsive to pressure in said conduit downstream from said conduit valve for closing the supply of substantially static pressure from said regulator to said mechanism in response to a predetermined low pressure and for venting pressure from said mechanism to close said valve, a by-pass between said regulator and mechanism around said pressure responsive means, and a valve controlling said by-pass, said valve controlling said by-pass being a multi-position construction for selectively closing said by-pass and transmitting pressure from the regulator by way of said means to said mechanism, or for venting the pressure from said mechanism and closing the connection between said means and mechanism.

5. A fluid control system comprising in combination a fluid supply conduit, a valve for said conduit, pressure responsive mechanism for opening said valve upon application of pressure and for closing it upon release of pressure, a source of fluid pressure, a pilot pressure regulator for supplying substantially static pressure from said source of fluid pressure to said mechanism for holding said valve open, means responsive to pressure in said conduit downstream from said conduit valve for closing the supply of static pressure from said regulator to said mechanism in response to a predetermined low pressure and for venting pressure from said mechanism to close said valve, a by-pass between said regulator and mechanism around said pressure responsive means, and a valve controlling said by-pass, said valve controlling said by-pass being a multi position construction for selectively closing said by-pass and transmitting pressure from the regulator and means to said mechanism, or for opening said by-pass and closing the connection between said means and mechanism.

6. A fluid control system comprising in combination a fluid supply conduit, a valve in said conduit operable by a pressure responsive element adapted to open the valve in response to a predetermined substantially static pressure on said element, means for supplying substantially static pressure to said element, means responsive to pressure in said conduit downstream from said valve and below a predetermined value for closing said valve by closing the supply of static pressure to said element and venting substantially static pressure from said element, and manually controlled means for selectively applying substantially static pressure to said element either dependent upon or independently of said pressure responsive means without adjusting any pressure setting at which either said valve or said pressure responsive means is adapted to be actuated.

7. A fluid control system comprising in combination a fluid supply conduit, a valve in said conduit adapted to open in response to a predetermined substantially static pressure on said valve, means for supplying substantially static pressure to said valve, means responsive to pressure in said conduit downstream from said valve and below a predetermined value for closing said valve by closing the supply of substantially static pressure thereto and venting substantially static pressure on said valve, said conduit downstream from said valve having a low pressure branch with a pressure reducing valve in said branch, said pressure responsive means being responsive to pressure in said low pressure branch downstream from said pressure reducing valve, a higher pressure branch from said conduit between said reducing valve and the first mentioned valve, and means responsive to pressure below a predetermined value in said high pressure branch for closing and venting said first mentioned pressure responsive means whereby said first mentioned valve is closed automatically in response to pressure below a desired value in either branch.

8. The combination with a main fluid pressure conduit, of a valve for closing and opening said conduit, pressure responsive mechanism for actuating said valve, a source of fluid under pressure, a static pressure conduit between said mechanism and said source for supplying pressure to said mechanism for holding the said valve open, a pressure responsive valve in said static pressure conduit for closing said conduit in response to pressure in the main conduit downstream from the first mentioned valve below a predetermined value and venting said mechanism, and a manual valve in one position connecting the static fluid pressure source to said mechanism independently of said second valve and in another position shutting off fluid pressure from said mechanism to said source and venting the mechanism so as to close said first mentioned valve.

9. The combination according to claim 8 in which said manual valve controls a by-pass for static fluid pressure around said second mentioned valve.

10. In a fluid control system, a main conduit through which fluid under pressure is delivered, a valve for closing and opening said conduit, pressure responsive mechanism for closing and opening said valve, a static pressure conduit between said mechanism and said main conduit upstream from said valve, a valve for closing and opening said static pressure conduit, a vent for relieving pressure from said mechanism when said second mentioned valve is closed, said vent being closed when the second mentioned valve is open, a pressure responsive element for said second mentioned valve, a static pressure conduit connecting said element and main conduit downstream from the first mentioned valve, said element being adjusted to close said second valve when the downstream pressure in the main conduit falls below a predetermined value, the combination therewith of the improvement enabling the first mentioned valve to be actuated at a distance without having to adjust said pressure responsive mechanism for said first valve, said improvement having a static pressure conduit by-passing said second mentioned valve, and valve mechanism adapted to connect said by-passing conduit with said first mentioned pressure mechanism for opening said first mentioned valve, said last mentioned mechanism being also adapted to close said by-passing conduit and connect said second valve with the first mentioned mechanism.

11. A system according to claim 10 in which a second vent is provided and the last mentioned mechanism is adapted to close both said by-passing conduit and the conduit in which the second mentioned valve is located and simultaneously connect the first mentioned mechanism for venting the same and closing the first mentioned valve.

12. A system according to claim 10 in which the first mentioned valve is a regulator and a pilot regulator is located in the first mentioned static pressure conduit for supplying static pressure to the first mentioned regulator either from said by-passing conduit or the second conduit controlled by said second mentioned valve.

13. A fluid control system comprising a conduit, a first pressure responsive means controlling the flow of said fluid in said conduit; a substantially static pressure connection for controlling the first pressure responsive means; a pilot pressure regulator for supplying substantially static pressure through said connection to said first pressure responsive means; a second pressure responsive means controlling the substantially static pressure in said connection actuating said first pressure responsive means, said second pressure responsive means being responsive to the pressure of said fluid downstream from said first pressure responsive means; a by-pass about said second pressure responsive means; and valve means operable to control the transmission of said substantially static pressure from said pilot regulator to said first pressure responsive means through said by-pas for rendering operation of aid system independent of said second pressure responsive means, said valve means being also operable to control the transmission of pressure through said second pressure responsive means to said first pressure responsive means, said valve means being adapted for selective connection of the substantially static pressure from the pilot regulator through said second pressure responsive means to the first pressure responsive means or from the pilot regulator through said by-pass to said first pressure responsive means.

14. A fluid control system comprising a conduit; a pressure regulator controlling the flow of said fluid in said conduit; a substantially static pressure connection for controlling said regulator; a pilot pressure regulator for supplying substantially static pressure through said connection to said first mentioned regulator; pressure responsive means controlling the pressure of said fluid which controls said pressure regulator, said connection passing through said pressure responsive means between said pilot pressure regulator and the first mentioned regulator, said pressure responsive means being responsive to the pressure of said fluid downstream from said pressure regulator; a by-pass about said pressure responsive means; valve means for selectively controlling the transmission of substantially static pressure from said pilot regulator to the first mentioned regulator through said by-pass for rendering operation of said system independent of said pressure responsive means, or controlling pressure through said pressure responsive means to said first mentioned regulator for operation of the first mentioned regulator in response to conduit pressure downstream from the first regulator, said valve means having also a position for venting pressure from said first mentioned regulator for closing the same.

15. A fluid control system comprising a fluid supply conduit; at least one fluid delivery conduit; a pressure regulator adapted to control the flow of fluid from said fluid supply conduit to said fluid delivery conduit; a substantially static pressure conduit capable of transmitting the supply pressure of said fluid to said pressure regulator; a pressure responsive valve controlling said pressure conduit; a substantially static pressure conduit capable of transmitting the delivery pressure of said fluid to said pressure responsive valve; a by-pass about said pressure responsive valve for rendering operation of the system independent of said pressure responsive valve by transmitting substantially static pressure from said supply conduit to said pressure regulator; and a manually controlled valve for selectively controlling transmission of pressure through said by-pass, or the transmission of pressure from said supply conduit through said pressure responsive valve, said manually controlled valve being constructed to effect opening and closing of said regulator.

ALFRED J. MILLER.

REFERENCES CITED

The following references are of record in the file of this patent:

UNITED STATES PATENTS

| Number | Name | Date |
| --- | --- | --- |
| 697,535 | Player | Apr. 15, 1902 |
| 1,769,612 | Wettstein | July 1, 1930 |
| 1,814,206 | Donkin | July 14, 1931 |
| 1,923,788 | Mastenbrook | Aug. 22, 1933 |
| 2,081,542 | Kidney | May 25, 1937 |
| 2,344,583 | Annin | Mar. 21, 1944 |
| 2,377,227 | Griswold | May 29, 1945 |